(12) United States Patent
Boroughs et al.

(10) Patent No.: US 10,957,056 B1
(45) Date of Patent: Mar. 23, 2021

(54) IMAGE TIEPOINTS

(71) Applicant: Raytheon Company, Waltham, MA (US)

(72) Inventors: Grant B. Boroughs, Southlake, TX (US); Stephen J. Raif, Sachse, TX (US); Jody D. Verret, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 21 days.

(21) Appl. No.: 16/557,305

(22) Filed: Aug. 30, 2019

(51) Int. Cl.
| G06K 9/48 | (2006.01) |
| G06T 7/32 | (2017.01) |
| G06T 7/13 | (2017.01) |
| G06T 7/60 | (2017.01) |

(52) U.S. Cl.
CPC .............. *G06T 7/32* (2017.01); *G06T 7/13* (2017.01); *G06T 7/60* (2013.01); *G06T 2207/10028* (2013.01); *G06T 2207/10032* (2013.01)

(58) Field of Classification Search
CPC .............. G06T 7/32; G06T 7/13; G06T 7/60
USPC ........................................................ 382/199
See application file for complete search history.

(56) References Cited

U.S. PATENT DOCUMENTS

2017/0200307 A1* 7/2017 Saha ...................... G06T 17/00

* cited by examiner

*Primary Examiner* — Stephen P Coleman
(74) *Attorney, Agent, or Firm* — Schwegman Lundberg & Woessner, P.A.

(57) ABSTRACT

An image processing technique uses requirements for a geospatial distribution of image tie points for a triangulation of images. The images are correlated, thereby generating candidate tie points across the images. Statistical consistency checks are applied to the images to identify and dispose of the candidate tie points that are local outliers, and a geometric identification technique is applied to the images to identify and dispose of the candidate tie points that are global outliers. The candidate tie points that are not local outliers or global outliers are spatially down-selected such that the spatially down-selected candidate tie points satisfy the one or more requirements for the geospatial distribution.

20 Claims, 7 Drawing Sheets

IMAGE TIEPOINTS

TECHNICAL FIELD

Embodiments described herein generally relate to image tie points, and more particularly, in an embodiment, to the automatic selection of image tie points in connection with requirements for image triangulation.

BACKGROUND

Tie points are used to correlate images in geospatial applications. The selection and use of these tie points normally must meet certain requirements. These requirements can be based on the requirements of a government agency or a private business entity. For example, the National Geospatial Intelligence Agency (NGA) has a Triangulation Specification that defines requirements for the geospatial distribution of image tie points to be used for triangulation of multiple images. The requirements for tie point distribution can be complex depending upon how image footprints overlap.

In the process of identifying and using image tie points, one or more prior processes first identify specific locations in images to correlate based on the requirements of the specification on hand. These prior processes use correlation, but each point is independent, and there are no rigorous quality checks or outlier rejections. It is up to the user to visually verify that each tie point has been accurately correlated, and to manually reject outliers. This can require several iterations of rejecting bad tie points, planning new areas to attempt to correlate, re-running the correlators, visually inspecting the tie points, and other human-based efforts. In short, these prior techniques first identify a sparse set of specific ground points that meet the requirements of the specification on hand, and then try to correlate the ground points across images. This is prone to failure and requires user verification of each tie point, and often requires many iterations.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Images, and in particular satellite images, have some inherent error in them regarding where the image actually exists or to where the image is actually pointing. By selecting candidate tie points between images, these candidate tie points can be used to create a triangulation in order to determine where those images actually are by averaging out uncertainties. In short, the candidate tie points are used for triangulation and for improved accuracy. This improved accuracy relates to both a relative geo-location perspective so that images align relative to one another and an absolute accuracy improvement also.

These candidate tie points are observation coordinates or image coordinates that represent the same location on the ground. However, when these candidate tie points are input into a process and adjusted, the adjustments should be accurate. To obtain this accuracy, the candidate tie points themselves should be accurate and also well-distributed.

In prior image processing techniques, as alluded to above, a problem is that these prior techniques require manually selecting a large number of candidate tie points between images, which further requires a lot of human effort to verify the candidate tie points. In these prior techniques, even if the candidate tie points are automatically generated, a human still needs to spend a good deal of time reviewing the candidate tie points to make sure that the candidate tie points are spatially well-distributed so that the candidate tie points conform to the specification at hand and that the candidate tie points are accurate.

Prior processes begin by identifying a sparse set of specific locations that satisfy the tie point distribution requirement. The prior processes calculate all the footprints and overlaps, and these prior processes place down some candidate tie points at particular locations. If these located tie points satisfy the specification or requirement, the prior processes then try to correlate the tie points. However, it is up to the user to circle back and verify that the correlations are good. If the user determines that the correlations are not good, the tie points are rejected, and the process is repeated by placing the tie points in different locations.

In contrast to prior processes, an embodiment of the present disclosure first generates a large number of candidate tie points for use in correlating images, statistically checks these candidate tie points for quality, and then down-selects a sparse set of these candidate tie points that meets the specification that is at hand. The terms down-select, spatial down-selection, and variants thereof simply mean the selection of a subset of candidate tie points from a larger set of tie points. The exact process for this down-selection is described later in this disclosure.

More specifically, in an embodiment of the present disclosure, many more tie points are automatically selected up front, and then statistical tools are used to filter out local region outliers and global region outliers. This generates a larger pool of candidate tie points to choose from, and automatic processing verifies or at least increases the confidence that they are good candidate tie points without any user involvement. After there is a good pool of candidate tie points, regions can be identified from which to select (e.g., nominal, excessive, and/or embedded regions), and the distribution is obtained from this selection. As noted above, the prior processes have a lot of user interaction because the prior processes only deal with an initial sparse grid of candidate tie points that these processes believe are in the right locations, but these processes cannot be certain that they can actually correlate the candidate tie points until these processes try to do so. In an embodiment of the present disclosure however, a number of correlations are executed, and this generates good correlations among the candidate tie points, and then geometric rules are applied to down-select these good candidate tie points into a set that meets the specification at hand.

An embodiment begins by using a robust image correlation to find a large number of candidate tie points. One such correlation is a Passive 3D Point Cloud code base. The passive 3D point cloud code base is a workflow that takes multiple images of the same area and it finds tie points between the multiple images. The passive 3D point cloud then runs those tie points through a sensor geometry (e.g., a bundle adjustment), and it extracts 3D point files from those images. However, for the present disclosure, an embodiment is not extracting the condensed 3D point files, the embodiment is simply using the tie point selection part of that workflow which is a fairly robust tie point calculator. The passive 3D point cloud base is further discussed in U.S. application Ser. No. 16/279,212, which is incorporated herein by reference. The large number of candidate tie points are then down-selected by calculating the footprint regions and overlap regions of the imagery, and in particular, two pairs of stereo images. The specification requirements that are being used are then applied to the down-selected candidate tie points to select the tie points in the required regions (nominal, excessive, and embedded) with the required spacing between the candidate tie points, the required distance of the candidate tie points to the edges of the images, and the required minimum number of candidate tie points. An example specification is that of the National Geospatial-Intelligence Agency. However, embodiments of the present disclosure can work with any specifications or requirements.

Consequently, one or more embodiments handle automatic determination of regions in which tie points are required by the specification on hand, automatic selection of well-distributed tie points as defined by the specification, automatic identification and handling of excessive overlap cases and embedded overlap cases, and automatic handling of re-task cases. A re-task case relates to a situation in which an insufficient number of candidate tie points were identified, and the process of identifying and down-selecting the candidate tie points is executed again. A re-task case can also relate to a situation where there are clouds or haze over an area, and the ground is not visible. The image capture therefore has to be executed or captured at a different time, that its, re-tasked, to get a cloud-free image.

As noted above, an embodiment uses image correlation techniques (previously used in other 3D product generation schemes) to automatically generate many candidate tie points across the entire image. Statistical consistency checks are then used on local regions to throw out local outliers, and a geometric identification technique such as triangulation and bundle adjustment is used with outlier rejection to throw out global outliers. After the rejection of the local and global outliers, a large, filtered set of good candidate tie points remains, and this large, filtered set of good candidate tie points is spatially down-selected to meet the distribution (between and among tie points) specification.

In contrast, as noted above, at least one prior art technique first identifies a sparse set of specific ground points to meet a distribution specification, and then tries to correlate the specific ground points across the pertinent images at hand. This prior technique is prone to failure and requires user verification of each candidate tie point. Consequently, the workflow of this prior technique often has to be iterated many times. As noted, embodiments of the current disclosure first generate a large number of candidate tie points, then statistically checks the candidate tie points for quality, and then down-selects the candidate tie points to generate a sparse set of tie points that meets the distribution specification.

Figure 1:
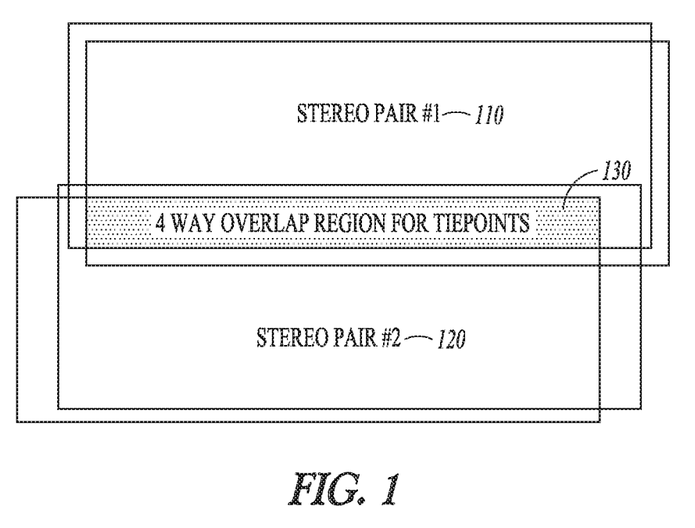
FIG. 1 is a diagram illustrating a four-way overlap region between two image pairs.

A triangulation of satellite images in general accommodates adjustments of multiple stereo pairs where the stereo pairs themselves overlap on the ground. For example, if there are four different images that represent the same location on the ground, there is a four-way overlap. An example of this four-way overlap is illustrated in FIG. 1, which illustrates a first stereo pair of images 110, a second pair of stereo images 120, and a four-way overlap region 130. In such a case, in order to simultaneously adjust these images for them to be robust and accurate, there has to be a specific distribution of tie point locations within this overlap region. For any stereo pair of images, the ground location can be calculated, but then there is an additional step of tying two other stereo pairs to get greater geographical coverage. This tying involves overlap between these stereo pairs. So instead of looking for two-way observations, four-way observations in those regions of stereo pair overlap can be considered, and based on how much overlap there is (based on rules in the pertinent specification), a required distribution of tie points can be determined. An embodiment identifies and handles these different overlap cases to automatically pick the candidate tie points in a well-distributed manner in these four-way overlap regions.

Figure 2:
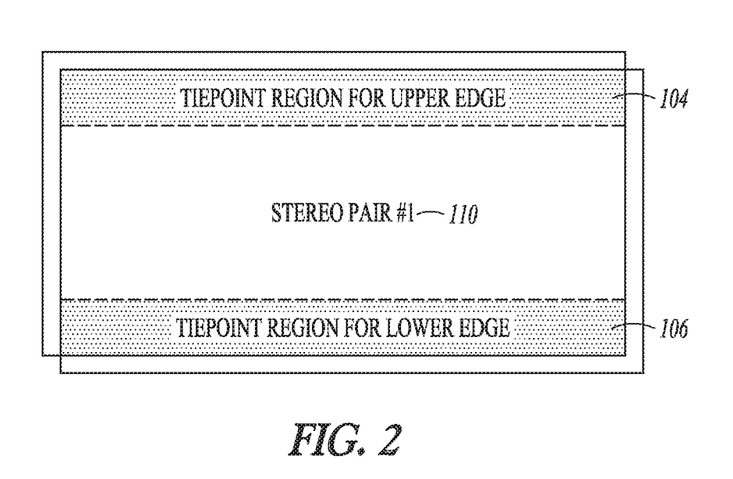
FIG. 2 is a diagram illustrating the positioning of edge regions in a stereo pair of images.

In addition to this overlap requirement, to insure that triangulations are accurate for the full extent of the image, for any individual stereo pair, the candidate tie points should also be within a certain distance of the edges. FIG. 2 illustrates two such edge regions 104 and 106. Otherwise, if the candidate tie points were in the middle of the multiple stereo pairs, a solution could be computed, but that solution may have extrapolation errors towards the edges. To avoid these errors, an embodiment bounds as much of the area of the stereo pairs as it can. As a result, there are two criteria that should be satisfied. First, there should be a four-way overlap between the multiple pairs of stereo images as explained above in connection with FIG. 1, and second, the candidate tie points should be within a certain distance of the edges of each individual stereo pair as illustrated in FIG. 2.

Figure 3:
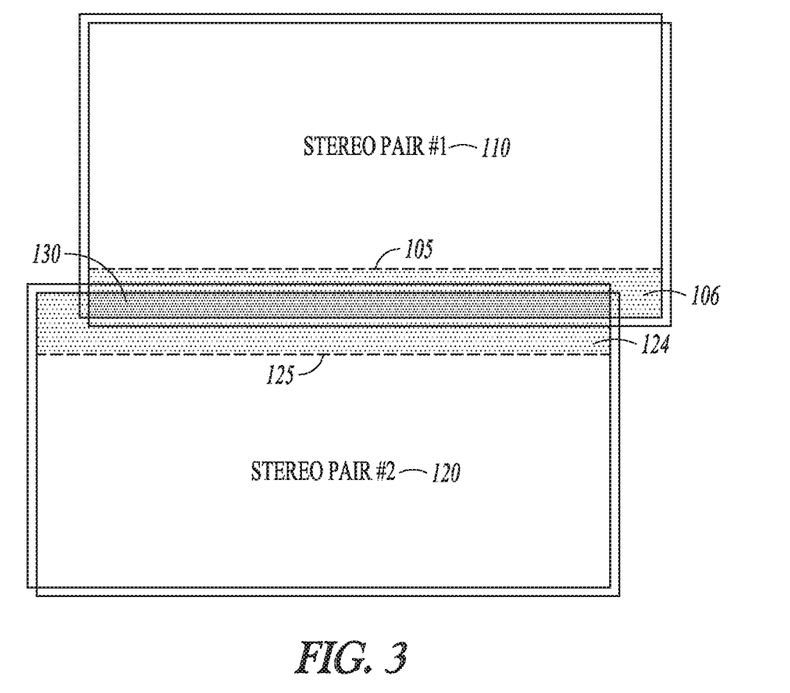
FIG. 3 is a diagram illustrating a nominal overlap case of two pairs of stereo images.

The candidate tie points should fall above the upper edge and below the lower edge so that there are candidate tie points in those edge regions. For example, referring to FIG. 3, the lower edge region 106 of stereo pair 110 overlaps with the upper edge region 124 of stereo pair 120 to create the overlap region 130. Any four-way points in overlap region 130 can be used to satisfy the criteria for both stereo pair 110 and stereo pair 120 at this shared edge between stereo pair 110 and stereo pair 120. This case, which can be referred to as the nominal case, is identified by determining if the lower edge line 105 for stereo pair 110 is above the upper edge line 125 for stereo pair 120. Since overlap between all four images is needed, and candidate tie points are needed in the edge regions, the nominal case is beneficial because there is overlap solely in the edge regions. The candidate tie points should be in the overlap region.

The nominal case is discussed in further detail below along with the excessive and embedded cases.

It should be noted that there is nothing wrong with having candidate tie points in the middle included in the solution. However, there should be candidate tie points at the edges so that the solution covers the entire image. For in a triangulation, when there are candidate tie points around the edges, the middle of the image is inherently included. However, if only candidate tie points in the middle of the image are being triangulated, it cannot be certain that the triangulation solution will be accurate out to the edges. Candidate tie points at the edges of the image provide a full footprint for triangulation.

The stereo pairs of images as illustrated in FIGS. 1-5 come from two completely different sensors at the same time, from the same sensor at two completely different times, or from different sensors at different times. In the most specific example, the multiple stereo pairs come from the same sensor seconds to minutes apart and all four images could be collected during the same orbital pass of a satellite. The four images could therefore be from the same sensor, just seconds apart, or they could be days apart and from different sensors. In any event, the images are geospatially related in some manner.

The multiple stereo images and the overlap regions can be thought of as footprints on the ground. That is, the place where the images cover a map on the ground. The overlap region is the region on the ground that is visible in all four images.

Figure 4:
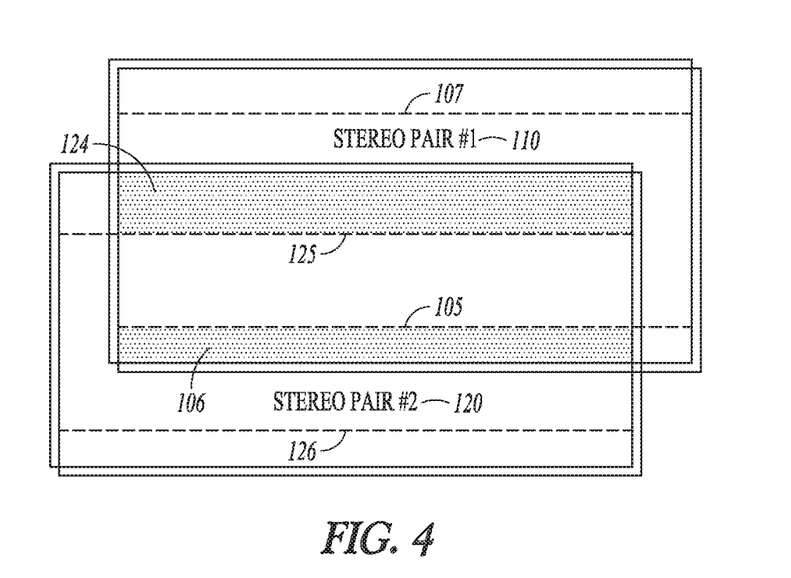
FIG. 4 is a diagram illustrating an excessive overlap case of two pairs of stereo images.

In the excessive overlap case illustrated in FIG. 4, an embodiment cannot use only one set of points because the two edge regions 106, 124 don't overlap like they did in the nominal case. That is, the lower edge region 106 of stereo pair 110 does not overlap with the upper edge region 124 of stereo pair 120. The excessive overlap case is identified by determining the relative position of the edge regions 106, 124. Specifically, the excessive overlap case is identified by determining if the lower edge line 105 of stereo pair 110 is below the upper edge line 125 of stereo pair 120, if the lower edge line 105 of stereo pair 110 is above lower edge line 126 of stereo pair 120, and if the upper edge line 107 of stereo pair 110 is above upper edge line 125 of stereo pair 120. As can be seen in FIG. 4, an edge region is above another edge region in a way that doesn't completely overlap or doesn't overlap at all. So while there is a single four-way overlap region in the nominal case, in the excessive overlap case, there is a separate edge region 106 for stereo pair 110 and a separate edge region 124 for stereo pair 120. Notwithstanding, both the nominal case and the excessive case involve a four-way overlap. The motivation for these overlap and edge requirements are for geometrics training.

Figure 5:
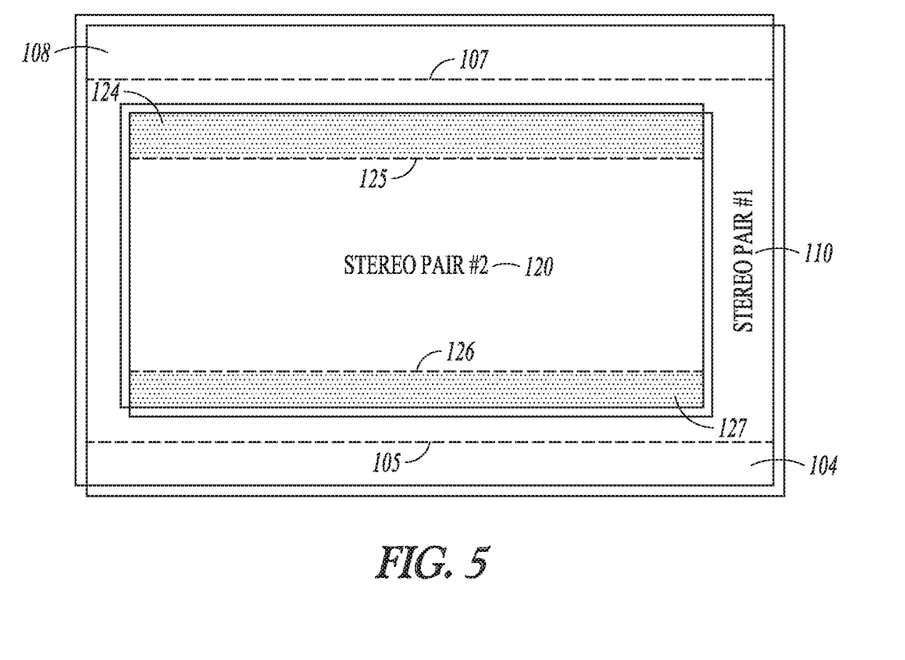
FIG. 5 is a diagram illustrating an embedded overlap case of two pairs of stereo images.

In the embedded case illustrated in FIG. 5, there is a single four-way overlap, but because stereo pair 120 is entirely within stereo pair 110, the edge points for the larger stereo pair 110 cannot be acquired because there is no four-way overlap up in the edges 104 and 108 of the larger stereo pair 110. That is, there are only edge points in the regions 124 and 127 of stereo pair 120. Consequently, it is necessary to select candidate tie points in two regions—124 and 127. The embedded case is detected by observing that the edge 125 of stereo pair 120 is below edge 107 of stereo pair 110 and lower edge 126 of stereo pair 120 is above edge 105 of stereo pair 110.

Once the system determines the type of overlap (nominal, excessive, or embedded), and therefore the regions from which the candidate tie points should be obtained, the original list of all the candidate tie points is filtered by location, which generates a set of candidate tie points that are appropriate for the overlap regions. Then, the system sub-selects those filtered, candidate tie points into a sparser set that meets the separation requirement. As noted, these candidate tie points should be in the overlap regions. Additionally, the candidate tie points should be a certain distance apart from each other. The distance increases the geometric strength of the solution since distributed candidate tie points provide a good, strong geometry when solving a triangulation. In short, once the regions are identified, the system generates a filtered set of points and then executes a final down-selection. While in theory every point in the entire area of the multiple stereo images could be used, that is not necessary and it would increase computation time.

Figure 6A:
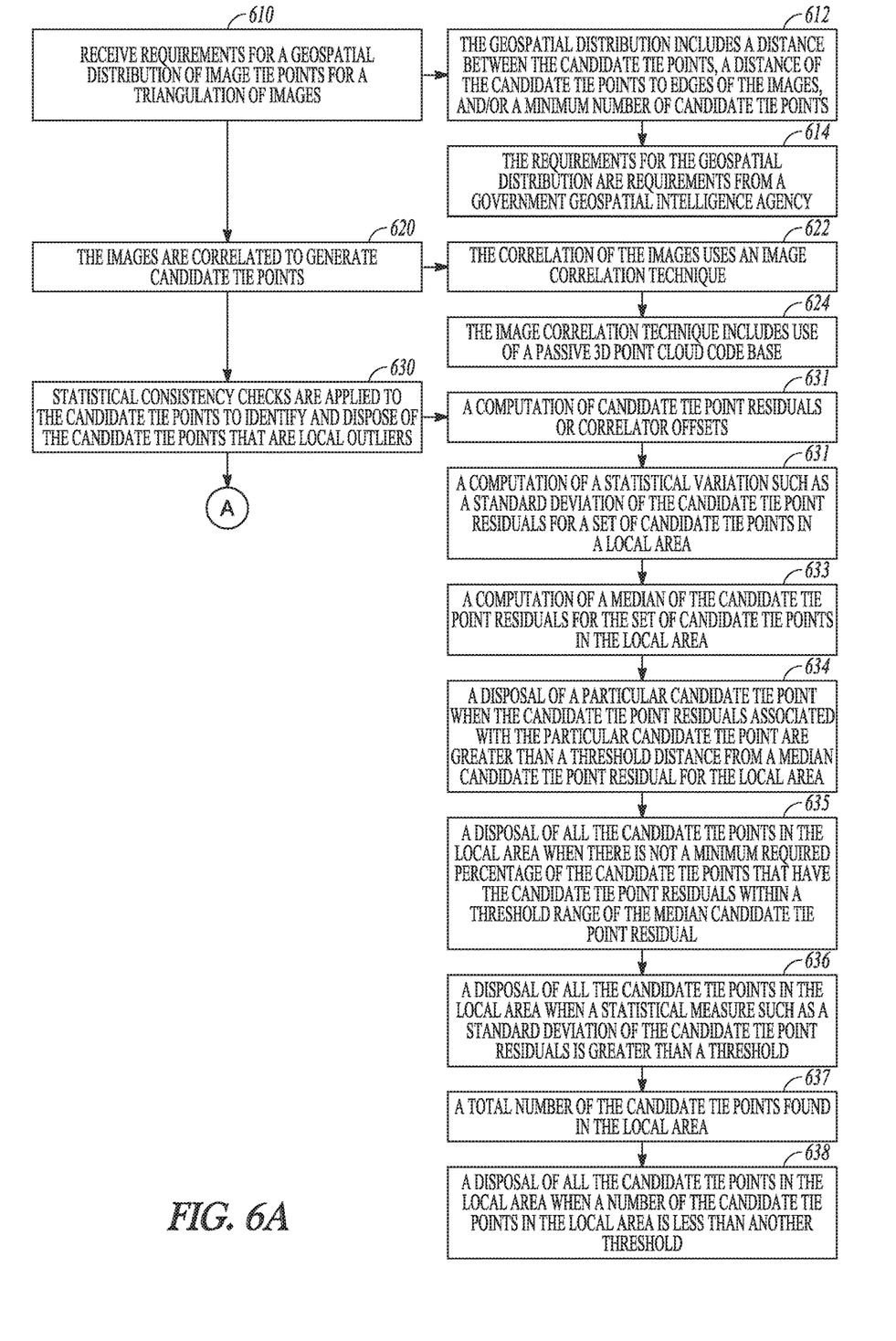
FIGS. 6A, 6B, and 6C are a block diagram illustrating operations and features of a process for the automatic selection of tie points for image triangulation.
Figure 6B:
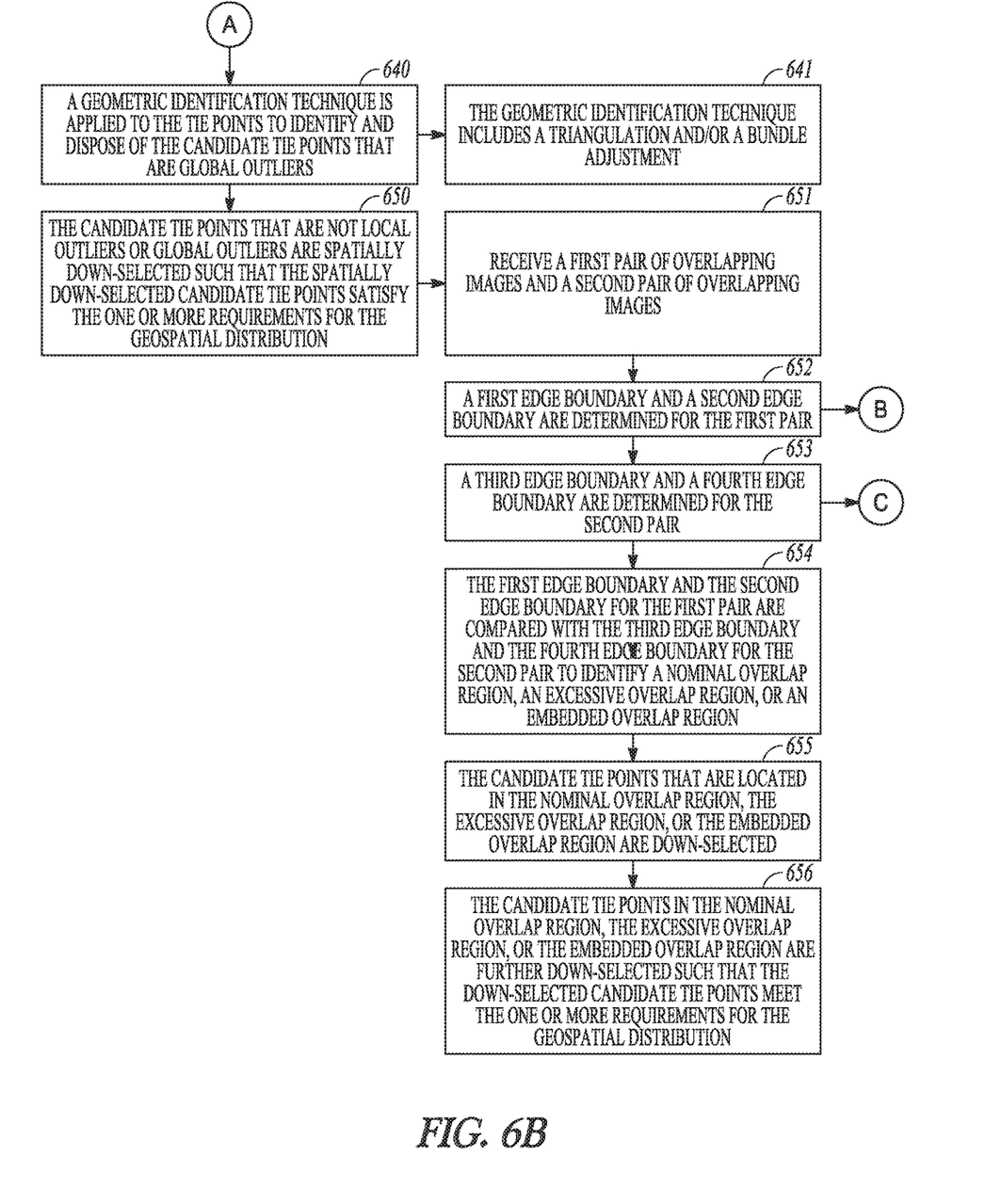
Figure 6C:
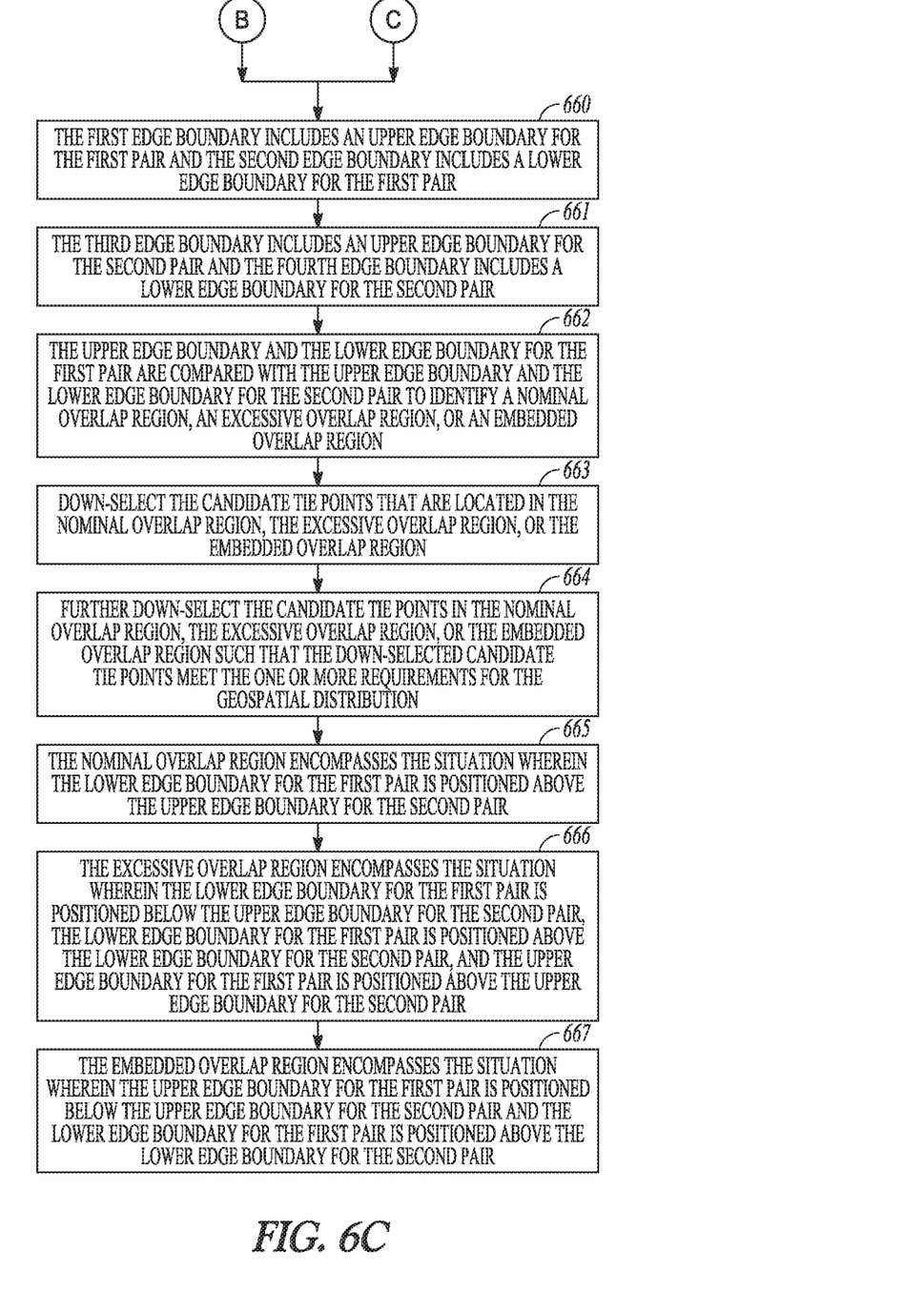

FIGS. 6A, 6B, and 6C are a block diagram illustrating operations and features of an example system and method for selecting image tie points. FIGS. 6A, 6B, and 6C include a number of process blocks 610-667. Though arranged substantially serially in the example of FIGS. 6A, 6B, and 6C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 6A, 6B, and 6C, at 610, requirements for a geospatial distribution of image tie points for a triangulation of images are received into a computer processor. As indicated at 612, the geospatial distribution includes a distance between the candidate tie points, a distance of the candidate tie points to edges of the images, and/or a minimum number of candidate tie points. As further indicated at 614, the requirements for the geospatial distribution are requirements from a government geospatial intelligence agency.

At 620, the images are correlated. The correlation of the images generates candidate tie points across the images. As indicated as 622, the correlation of the images uses an image correlation technique, and as indicated at 624, the image correlation technique includes use of a passive 3D point cloud code base.

At 630, statistical consistency checks are applied to the candidate tie points to identify and dispose of the candidate tie points that are local outliers. The statistical consistency checks can include one or more of the following—a computation of candidate tie point residuals or correlator offsets (631), a computation of a statistical variation such as a standard deviation of the candidate tie point residuals for a set of candidate tie points in a local area (632), a computation of a median of the candidate tie point residuals for the set of candidate tie points in the local area (633), a disposal of a particular candidate tie point when the candidate tie point residuals associated with the particular candidate tie point are greater than a threshold distance from a median candidate tie point residual for the local area (634), a disposal of all the candidate tie points in the local area when there is not a minimum required percentage of the candidate tie points that have the candidate tie point residuals within a threshold range of the median candidate tie point residual (635), a disposal of all the candidate tie points in the local area when a statistical measure such as a standard deviation of the candidate tie point residuals is greater than a threshold (636), a total number of the candidate tie points found in the local area (637), and a disposal of all the candidate tie points in the local area when a number of the candidate tie points in the local area is less than another threshold (638).

At 640, a geometric identification technique is applied to the tie points to identify and dispose of the candidate tie points that are global outliers. As indicated at 641, the geometric identification technique can include a triangulation and/or a bundle adjustment, among others.

At 650, the candidate tie points that are not local outliers or global outliers are spatially down-selected such that the spatially down-selected candidate tie points satisfy the one or more requirements for the geospatial distribution. The spatial down-selection of the candidate tie points includes several steps. At 651, a first pair of overlapping images and a second pair of overlapping images is received. The first pair and the second pair overlap such that there is an area that is common to both the first pair and the second pair. At 652, a first edge boundary and a second edge boundary are determined for the first pair, and at 653 a third edge boundary and a fourth edge boundary are determined for the second pair. At 654, the first edge boundary and the second edge boundary for the first pair are compared with the third edge boundary and the fourth edge boundary for the second pair to identify a nominal overlap region, an excessive overlap region, or an embedded overlap region. At 655, the candidate tie points that are located in the nominal overlap region, the excessive overlap region, or the embedded overlap region are down-selected. And at 656, the candidate tie points in the nominal overlap region, the excessive overlap region, or the embedded overlap region are further down-selected such that the down-selected candidate tie points meet the one or more requirements for the geospatial distribution.

At 660, it is noted that the first edge boundary includes an upper edge boundary for the first pair and the second edge boundary includes a lower edge boundary for the first pair, and at 661, the third edge boundary includes an upper edge boundary for the second pair and the fourth edge boundary includes a lower edge boundary for the second pair. Then, with these further definitions of the edge boundaries, the spatial down-selection of the candidate tie points executes as follows. At 662, the upper edge boundary and the lower edge boundary for the first pair are compared with the upper edge boundary and the lower edge boundary for the second pair to identify a nominal overlap region, an excessive overlap region, or an embedded overlap region. After this comparison, at 663, the candidate tie points that are located in the nominal overlap region, the excessive overlap region, or the embedded overlap region are down-selected. And at 664, the candidate tie points in the nominal overlap region, the excessive overlap region, or the embedded overlap region are further down-selected such that the down-selected candidate tie points meet the one or more requirements for the geospatial distribution.

At 665, the nominal overlap region encompasses the situation wherein the lower edge boundary for the first pair is positioned above the upper edge boundary for the second pair. This positioning forms the nominal overlap region containing candidate tie points located within each of the first pair and the second pair.

At 666, the excessive overlap region encompasses the situation wherein the lower edge boundary for the first pair is positioned below the upper edge boundary for the second pair, the lower edge boundary for the first pair is positioned above the lower edge boundary for the second pair, and the upper edge boundary for the first pair is positioned above the upper edge boundary for the second pair. These positionings form two overlap regions from which the candidate tie points are down-selected.

At 667, the embedded overlap region encompasses the situation wherein the upper edge boundary for the first pair is positioned below the upper edge boundary for the second pair and the lower edge boundary for the first pair is positioned above the lower edge boundary for the second pair. These positionings form two overlap regions from which the candidate tie points are down selected.

Figure 7:
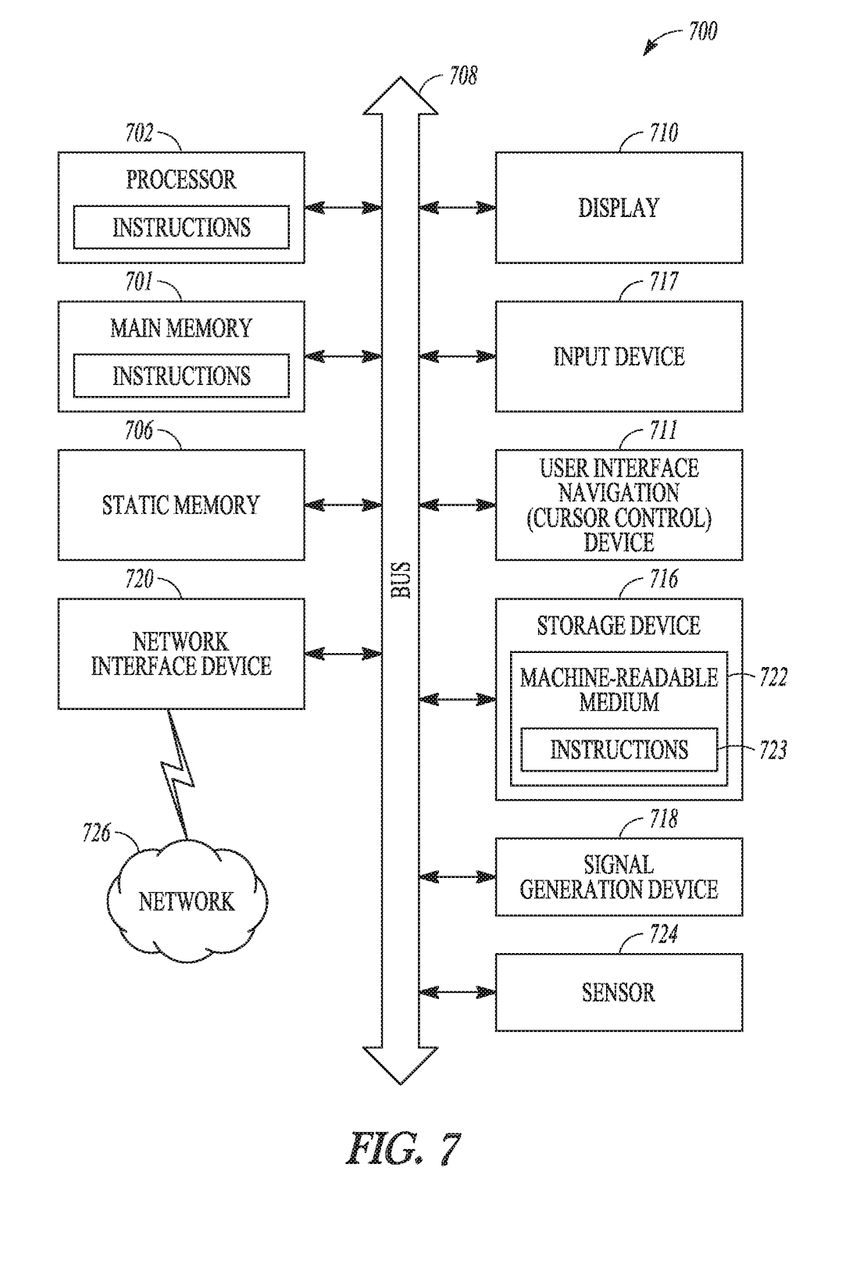
FIG. 7 is a block diagram of a computer system upon which one or more embodiments of the present disclosure can execute.

FIG. 7 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 701 and a static memory 706, which communicate with each other via a bus 708. The computer system 700 may further include a display unit 710, an alphanumeric input device 717 (e.g., a keyboard), and a user interface (UI) navigation device 711 (e.g., a mouse). In one embodiment, the display, input device and cursor control device are a touch screen display. The computer system 700 may additionally include a storage device 716 (e.g., drive unit), a signal generation device 718 (e.g., a speaker), a network interface device 720, and one or more sensors 721, such as a global positioning system sensor, compass, accelerometer, or other sensor.

The drive unit 716 includes a machine-readable medium 722 on which is stored one or more sets of instructions and data structures (e.g., software 723) embodying or utilized by any one or more of the methodologies or functions described herein. The software 723 may also reside, completely or at least partially, within the main memory 701 and/or within the processor 702 during execution thereof by the computer system 700, the main memory 701 and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 723 may further be transmitted or received over a communications network 726 using a transmission medium via the network interface device 720 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process comprising:
   receiving into a computer processor one or more requirements for a geospatial distribution of image tie points for a triangulation of a plurality of images;
   correlating the plurality of images, thereby generating a plurality of candidate tie points across the plurality of images;
   applying one or more statistical consistency checks to identify and dispose of the candidate tie points that are local outliers;
   applying a geometric identification technique to identify and dispose of the candidate tie points that are global outliers; and
   spatially down-selecting the candidate tie points that are not local outliers or global outliers such that the spatially down-selected candidate tie points satisfy the one or more requirements for the geospatial distribution.

2. The process of claim 1, wherein the one or more statistical consistency checks comprise one or more of a computation of candidate tie point residuals or correlator offsets, a computation of a statistical variation of the candidate tie point residuals for a set of candidate tie points in a local area, a computation of a median of the candidate tie point residuals for the set of candidate tie points in the local area, a disposal of a particular candidate tie point when the candidate tie point residuals associated with the particular candidate tie point are greater than a threshold distance from a median candidate tie point residual for the local area, a disposal of all the candidate tie points in the local area when there is not a minimum required percentage of the candidate tie points that have the candidate tie point residuals within a threshold range of the median candidate tie point residual, a disposal of all the candidate tie points in the local area when a statistical measure of the candidate tie point residuals is greater than a first threshold, a total number of the candidate tie points found in the local area, and a disposal of all the candidate tie points in the local area when a number of the candidate tie points in the local area is less than a second threshold.

3. The process of claim 1, wherein the geometric identification technique comprises one or more of a triangulation and a bundle adjustment.

4. The process of claim 1, wherein the geospatial distribution comprises one or more of a distance between the candidate tie points, a distance of the candidate tie points to edges of the plurality of images, and a minimum number of candidate tie points.

5. The process of claim 4, wherein the requirements for the geospatial distribution comprise requirements from a government geospatial intelligence agency.

6. The process of claim 1, wherein the correlating the plurality of images comprises use of an image correlation technique.

7. The process of claim 6, wherein the image correlation technique comprises a passive 3D point cloud code base.

8. The process of claim 1, wherein the spatial down-selection of the candidate tie points comprises:
   receiving into the computer processor a first pair of overlapping images and a second pair of overlapping images, wherein the first pair and the second pair further overlap such that there is an area that is common to both the first pair and the second pair;
determining a first edge boundary and a second edge boundary for the first pair;
determining a third edge boundary and a fourth edge boundary for the second pair;
comparing the first edge boundary and the second edge boundary for the first pair with the third edge boundary and the fourth edge boundary for the second pair to identify a nominal overlap region, an excessive overlap region, or an embedded overlap region;
down-selecting the candidate tie points that are located in the nominal overlap region, the excessive overlap region, or the embedded overlap region; and
further down-selecting the candidate tie points in the nominal overlap region, the excessive overlap region, or the embedded overlap region such that the down-selected candidate tie points meet the one or more requirements for the geospatial distribution.

9. The process of claim 8,
wherein the first edge boundary comprises an upper edge boundary for the first pair and the second edge boundary comprises a lower edge boundary for the first pair;
wherein the third edge boundary comprises an upper edge boundary for the second pair and the fourth edge boundary comprises a lower edge boundary for the second pair; and
wherein the spatial down-selection of the candidate tie points comprises:
comparing the upper edge boundary and the lower edge boundary for the first pair with the upper edge boundary and the lower edge boundary for the second pair to identify a nominal overlap region, an excessive overlap region, or an embedded overlap region;
down-selecting the candidate tie points that are located in the nominal overlap region, the excessive overlap region, or the embedded overlap region; and
further down-selecting the candidate tie points in the nominal overlap region, the excessive overlap region, or the embedded overlap region such that the down-selected candidate tie points meet the one or more requirements for the geospatial distribution.

10. The process of claim 9, wherein the nominal overlap region comprises the lower edge boundary for the first pair positioned above the upper edge boundary for the second pair, thereby forming the nominal overlap region containing candidate tie points located within each of the first pair and the second pair.

11. The process of claim 9, wherein the excessive overlap region comprises the lower edge boundary for the first pair positioned below the upper edge boundary for the second pair, the lower edge boundary for the first pair positioned above the lower edge boundary for the second pair, and the upper edge boundary for the first pair positioned above the upper edge boundary for the second pair; thereby forming two overlap regions from which the candidate tie points are down-selected.

12. The process of claim 9, wherein the embedded overlap region comprises the upper edge boundary for the first pair positioned below the upper edge boundary for the second pair and the lower edge boundary for the first pair positioned above the lower edge boundary for the second pair, thereby forming two overlap regions from which the candidate tie points are down selected.

13. A non-transitory computer readable medium comprising instructions that when executed by a processor execute a process comprising:
receiving into a computer processor one or more requirements for a geospatial distribution of image tie points for a triangulation of a plurality of images;
correlating the plurality of images, thereby generating a plurality of candidate tie points across the plurality of images;
applying one or more statistical consistency checks to identify and dispose of the candidate tie points that are local outliers;
applying a geometric identification technique to identify and dispose of the candidate tie points that are global outliers; and
spatially down-selecting the candidate tie points that are not local outliers or global outliers such that the spatially down-selected candidate tie points satisfy the one or more requirements for the geospatial distribution.

14. The non-transitory computer readable medium of claim 13, wherein the geospatial distribution comprises one or more of a distance between the candidate tie points, a distance of the candidate tie points to edges of the plurality of images, and a minimum number of candidate tie points; and wherein the requirements for the geospatial distribution comprise requirements from a government geospatial intelligence agency.

15. The non-transitory computer readable medium of claim 13, wherein the correlating the plurality of images comprises use of an image correlation technique; and wherein the image correlation technique comprises a passive 3D point cloud code base.

16. The non-transitory computer readable medium of claim 13, wherein the spatial down-selection of the candidate tie points comprises:
receiving into the computer processor a first pair of overlapping images and a second pair of overlapping images, wherein the first pair and the second pair further overlap such that there is an area that is common to both the first pair and the second pair;
determining a first edge boundary and a second edge boundary for the first pair;
determining a third edge boundary and a fourth edge boundary for the second pair;
comparing the first edge boundary and the second edge boundary for the first pair with the third edge boundary and the fourth edge boundary for the second pair to identify a nominal overlap region, an excessive overlap region, or an embedded overlap region;
down-selecting the candidate tie points that are located in the nominal overlap region, the excessive overlap region, or the embedded overlap region; and
further down-selecting the candidate tie points in the nominal overlap region, the excessive overlap region, or the embedded overlap region such that the down-selected candidate tie points meet the one or more requirements for the geospatial distribution.

17. The non-transitory computer readable medium of claim 16,
wherein the first edge boundary comprises an upper edge boundary for the first pair and the second edge boundary comprises a lower edge boundary for the first pair;
wherein the third edge boundary comprises an upper edge boundary for the second pair and the fourth edge boundary comprises a lower edge boundary for the second pair; and wherein the spatial down-selection of the candidate tie points comprises:

comparing the upper edge boundary and the lower edge boundary for the first pair with the upper edge boundary and the lower edge boundary for the second pair to identify a nominal overlap region, an excessive overlap region, or an embedded overlap region;

down-selecting the candidate tie points that are located in the nominal overlap region, the excessive overlap region, or the embedded overlap region; and further down-selecting the candidate tie points in the nominal overlap region, the excessive overlap region, or the embedded overlap region such that the down-selected candidate tie points meet the one or more requirements for the geospatial distribution.

18. The non-transitory computer readable medium of claim 17, wherein the nominal overlap region comprises the lower edge boundary for the first pair positioned above the upper edge boundary for the second pair, thereby forming the nominal overlap region containing candidate tie points located within each of the first pair and the second pair; wherein the excessive overlap region comprises the lower edge boundary for the first pair positioned below the upper edge boundary for the second pair, the lower edge boundary for the first pair positioned above the lower edge boundary for the second pair, and the upper edge boundary for the first pair positioned above the upper edge boundary for the second pair; thereby forming two overlap regions from which the candidate tie points are down-selected; and wherein the embedded overlap region comprises the upper edge boundary for the first pair positioned below the upper edge boundary for the second pair and the lower edge boundary for the first pair positioned above the lower edge boundary for the second pair, thereby forming two overlap regions from which the candidate tie points are down selected.

19. A system comprising:
a computer processor; and
a computer memory coupled to the computer processor;
wherein the computer processor is configured to execute a process comprising:

receiving into a computer processor one or more requirements for a geospatial distribution of image tie points for a triangulation of a plurality of images;

correlating the plurality of images, thereby generating a plurality of candidate tie points across the plurality of images;

applying one or more statistical consistency checks to identify and dispose of the candidate tie points that are local outliers;

applying a geometric identification technique to identify and dispose of the candidate tie points that are global outliers; and spatially down-selecting the candidate tie points that are not local outliers or global outliers such that the spatially down-selected candidate tie points satisfy the one or more requirements for the geospatial distribution.

20. The system of claim 19, wherein the spatial down-selection of the candidate tie points comprises:

receiving into the computer processor a first pair of overlapping images and a second pair of overlapping images, wherein the first pair and the second pair further overlap such that there is an area that is common to both the first pair and the second pair;

determining a first edge boundary and a second edge boundary for the first pair;

determining a third edge boundary and a fourth edge boundary for the second pair;

comparing the first edge boundary and the second edge boundary for the first pair with the third edge boundary and the fourth edge boundary for the second pair to identify a nominal overlap region, an excessive overlap region, or an embedded overlap region;

down-selecting the candidate tie points that are located in the nominal overlap region, the excessive overlap region, or the embedded overlap region; and further down-selecting the candidate tie points in the nominal overlap region, the excessive overlap region, or the embedded overlap region such that the down-selected candidate tie points meet the one or more requirements for the geospatial distribution.

* * * * *

UNITED STATES PATENT AND TRADEMARK OFFICE
CERTIFICATE OF CORRECTION

Page 1 of 1

PATENT NO. : 10,957,056 B1
APPLICATION NO. : 16/557305
DATED : March 23, 2021
INVENTOR(S) : Boroughs et al.

It is certified that error appears in the above-identified patent and that said Letters Patent is hereby corrected as shown below:

On the Title Page

Item (22), in "Filed", in Column 1, Line 1, after "2019", insert:
--(65) Prior Publication Data
US 2021/0065386 A1 Mar. 4, 2021--

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*